US011256680B2

(12) United States Patent
Gohad et al.

(10) Patent No.: US 11,256,680 B2
(45) Date of Patent: Feb. 22, 2022

(54) RESOURCE ESTIMATION FOR MVCC-ENABLED DATABASE

(71) Applicant: SAP SE, Walldorf (DE)

(72) Inventors: Nilesh Gohad, Pune (IN); Amit Pathak, Pune (IN); Dheren Gala, Pune (IN)

(73) Assignee: SAP SE, Walldorf (DE)

( * ) Notice: Subject to any disclaimer, the term of this patent is extended or adjusted under 35 U.S.C. 154(b) by 307 days.

(21) Appl. No.: 16/411,700

(22) Filed: May 14, 2019

(65) Prior Publication Data

US 2020/0364202 A1 Nov. 19, 2020

(51) Int. Cl.
*G06F 16/00* (2019.01)
*G06F 16/23* (2019.01)
*G06F 16/22* (2019.01)
*G06F 12/02* (2006.01)
*G06F 16/2455* (2019.01)

(52) U.S. Cl.
CPC ...... *G06F 16/2343* (2019.01); *G06F 12/0253* (2013.01); *G06F 16/2282* (2019.01); *G06F 16/24552* (2019.01); *G06F 2212/6042* (2013.01)

(58) Field of Classification Search
CPC ............ G06F 16/2343; G06F 16/2282; G06F 12/0253; G06F 16/24552; G06F 2212/6042; G06F 16/2329
See application file for complete search history.

(56) References Cited

U.S. PATENT DOCUMENTS

| | | | |
|---|---|---|---|
| 9,652,169 B2 * | 5/2017 | Bhattacharjee | G06F 9/467 |
| 2005/0086263 A1 * | 4/2005 | Ngai | G06F 16/217 |
| 2014/0136571 A1 * | 5/2014 | Bonvin | G06F 16/2219 707/792 |
| 2016/0299798 A1 * | 10/2016 | Bhattacharjee | G06F 12/1466 |
| 2018/0253467 A1 * | 9/2018 | Gurajada | G06F 16/2255 |
| 2018/0349270 A1 * | 12/2018 | Mittal | G06F 3/0673 |
| 2019/0354407 A1 * | 11/2019 | Booss | G06F 16/221 |

OTHER PUBLICATIONS

Xiangyao Yu et al ("Sundial: Harmonizing Concurrency Control and Caching in a Distributed OLTP Database Management System"), Aug. 2018, pp. 1289-1302 (Year: 2018).*

* cited by examiner

*Primary Examiner* — Jared M Bibbee

(74) *Attorney, Agent, or Firm* — Buckley, Maschoff & Talwalkar LLC

(57) ABSTRACT

Systems and methods may include execution of a database workload on a plurality of database tables, collection of execution statistics associated with execution of the database workload, determination of an in-memory row storage cache size for multi-version concurrency control based on the collected execution statistics, and configuration of a database system to allocate the in-memory row storage cache size for multi-version concurrency control.

20 Claims, 9 Drawing Sheets

Workload Profiler

DBName: <db_name>

| TableName | NRows | RowsInIMRS | PctInIMRS | IMRSCache_MB | VersionDb_MB |
|---|---|---|---|---|---|
| ~~~~~~ | ~~~~ | ~~~~~~~~ | ~~~~~~~ | ~~~~~~ | ~~~~ |
| ~~~~~~ | ~~~~ | ~~~~~~~~ | ~~~~~~~ | ~~~~~~ | ~~~~ |
| ~~~~~~ | ~~~~ | ~~~~~~~~ | ~~~~~~~ | ~~~~~~ | ~~~~ |
| ~~~~~~ | ~~~~ | ~~~~~~~~ | ~~~~~~~ | ~~~~~~ | ~~~~ |

Total IMRS Cache and Version DB sizes needed for the workload:

| DBName | IMRSCacheSizeMB | VersionDbSizeMB |
|---|---|---|
| <db_name> | 1811 | 1571 |

*FIG. 5*

RESOURCE ESTIMATION FOR MVCC-ENABLED DATABASE

BACKGROUND

Multiversion concurrency control (MVCC) allows a database server to lock rows for writing in one session while granting access to unaltered versions of these rows in another session. MVCC therefore provides client applications with a snapshot view of the database and allows non-blocking behavior for read operations.

MVCC requires memory resources in addition to those required for non-MVCC-enabled operation to maintain multiple versions of row and snapshot data. Database systems implementing MVCC are therefore configured to include an appropriate amount of resources. Under-configuring the resources may result in resource exhaustion, leading to transaction aborts and rollbacks. Over-configuring the resources may result in inefficient resource use. There is a need to efficiently and accurately estimate the amount of resources required to support MVCC in a given database system.

BRIEF DESCRIPTION OF THE DRAWINGS

FIG. 5 is a view of a user interface presenting estimated resource sizes according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

According to some embodiments, execution of a database workload is observed and statistics of the execution are collected. Based on the workload statistics, a in-memory row storage (IMRS) cache size required for a database system to provide MVCC functionality for the workload is estimated. If on-disk MVCC is to be enabled, a required disk storage size of a version database is also estimated based on the workload statistics.

For example, based on the collected workload statistics, the maximum number of row versions that will be created by an active workload at any point of time in the system is estimated. Embodiments may estimate the maximum number of row versions that will be active at a given time at a per-Table-per-Transaction level.

Figure 1:
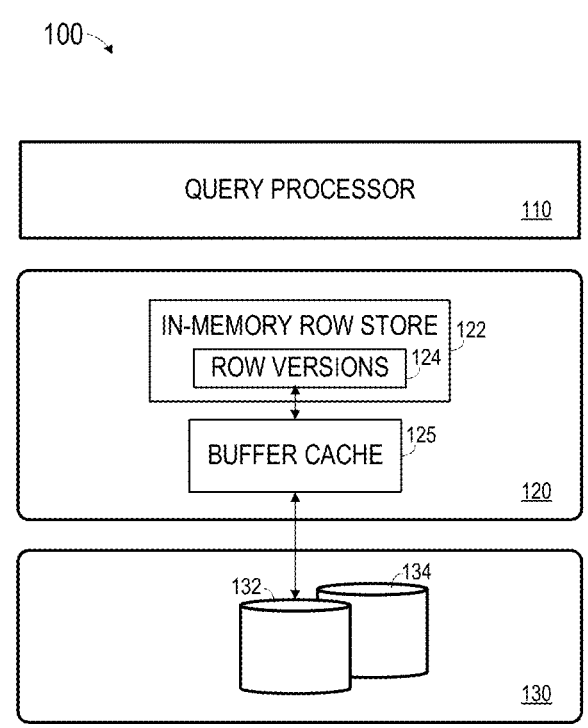
FIG. 1 is a block diagram of a database system providing in-memory row store MVCC according to some embodiments.

The estimated version memory size is a block of memory needed to maintain the estimated maximum number of row versions, including both the latest row versions and older row versions. The estimated version memory size also includes memory for storing support structures (e.g., index size, partition-level information) associated with the stored row versions FIG. 1 is a block diagram of database system 100 according to some embodiments. Database system 100 may implement IMRS MVCC as is known in the art. Accordingly, embodiments may operate to determine an IMRS cache size to configure for database system 100. Additionally, database system 100 may comprise a testing system to determine an IMRS cache size for IMRS MVCC according to some embodiments. Embodiments are not limited to the FIG. 1 architecture.

Database system 100 includes query processor 110, volatile memory 120 and persistent memory 130. Generally, database system 100 operates to receive queries and return results based on data stored within volatile memory 120 and/or persistent memory 130. A received query may include instructions to create, read, update or delete one or more records.

Query processor 110 processes received Structured Query Language (SQL) and Multi-Dimensional eXpression (MDX) statements. Query processor 110 comprises program code executable to pre-process a received query, generate a query execution plan, and execute the plan based on data within volatile memory 120 and/or persistent memory 130.

Volatile memory 120 includes IMRS 122 as is known in the art. Generally, IMRS 122 stores frequently-accessed rows, rather than full tables associated with the rows. As rows of IMRS 122 become less-frequently used, these rows are automatically "packed" back to page store/buffer cache 125. As also shown, system 100 supports IMRS MVCC in which MVCC row versions 124 are also stored in IMRS 122.

Persistent memory 130 comprises data volumes 132 storing database tables and log volumes 134 storing transaction logs as is known in the art. Persistent memory 130 may also comprise a distributed system using any combination of storage devices that are or become known.

Database system 100 may also include program code to perform administrative and management functions. Such functions may include external communication, lifecycle management, snapshot and backup, indexing, optimization, garbage collection, and/or any other database functions that are or become known.

Figure 2:
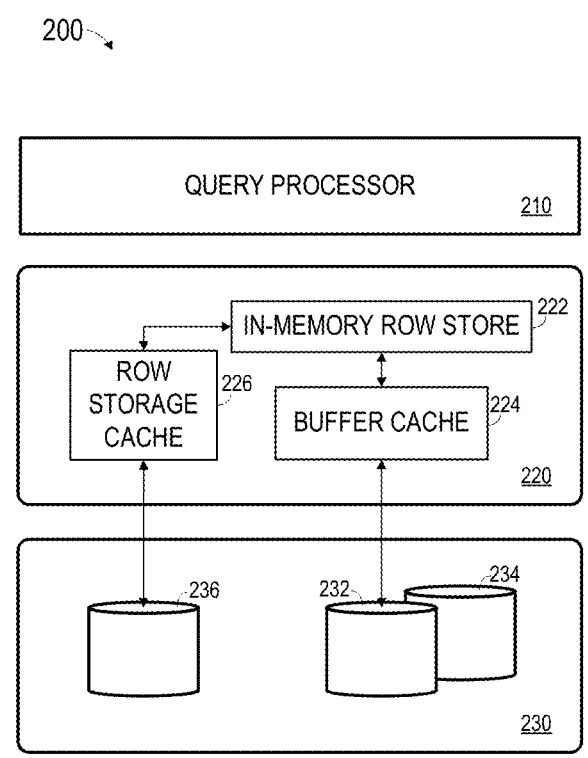
FIG. 2 is a block diagram of a database system providing on-disk MVCC according to some embodiments.

FIG. 2 illustrates database system 200 including query processor 210, volatile memory 220 and persistent memory 230. Database system 200 may implement on-disk MVCC as is known in the art. Embodiments may operate to determine an IMRS cache size and an on-disk version storage size to configure for database system 200. Database system 200 may also or alternatively comprise a system to determine an IMRS cache size and an on-disk version storage size for on-disk MVCC according to some embodiments.

Specifically, volatile memory 220 includes IMRS 222 which operates as described above with respect to IMRS 122. However, IMRS 222 does not store MVCC row versions therein. Rather, row versions are stored in temporary database 236 of persistent storage 230. Memory-resident row version metadata cache 226 stores links to and metadata of row versions that reside in version store temporary database 236.

A database system according to some embodiments may be configured by an administrator to configure user permissions, specify backup parameters, define logical schemas, and configure resources such as allocated memory (i.e., IMRS cache size and on-disk version storage size). These permissions, parameters and definitions may be stored within system tables of data volumes 132 or 232 as is known in the art.

Figure 3:
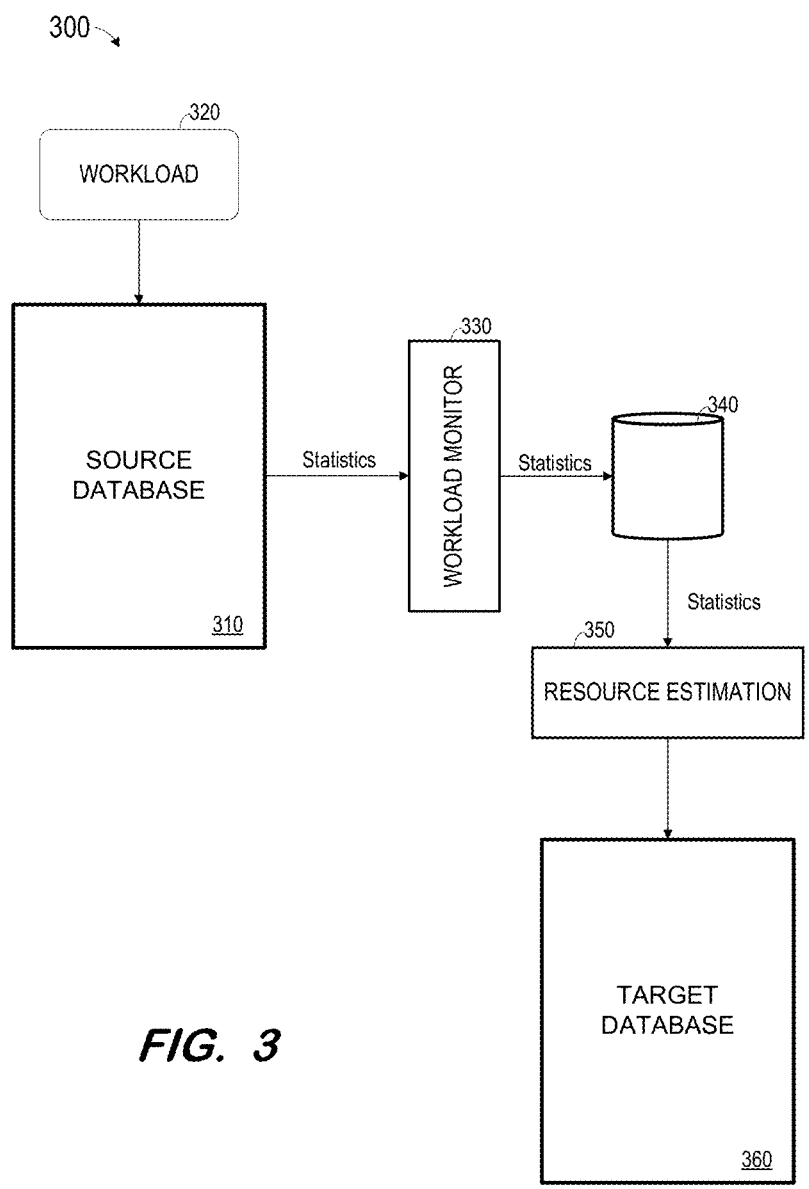
FIG. 3 illustrates MVCC resource estimation according to some embodiments.
Figure 4:
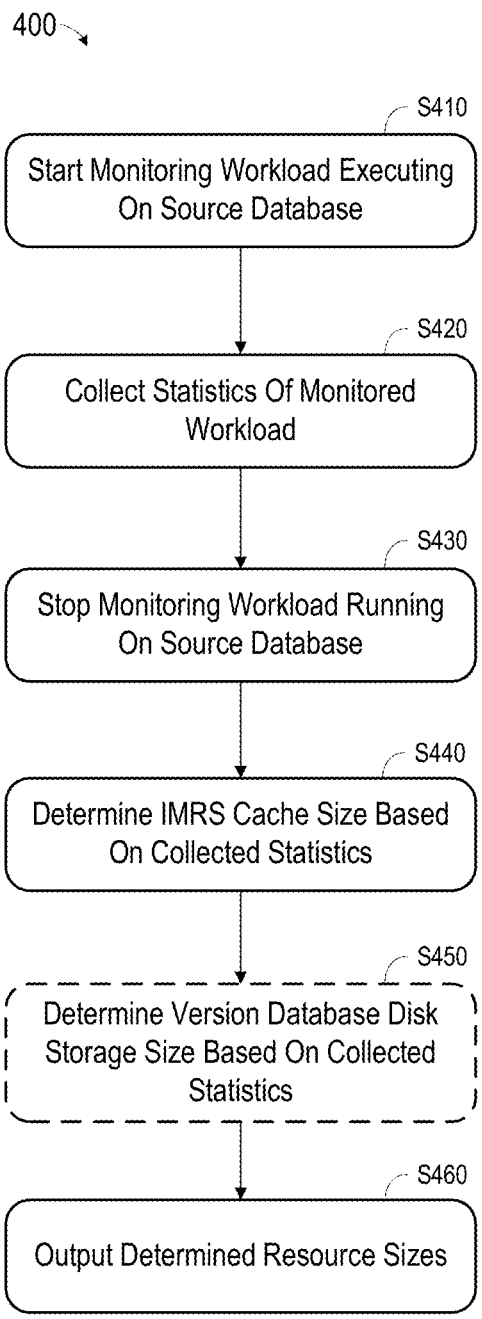
FIG. 4 is a flow diagram of a process to estimate MVCC resource sizes according to some embodiments.

FIG. 3 illustrates system 300 to estimate MVCC resource requirements according to some embodiments. System 300 may implement process 400 according to some embodiments.

Process 400 and all other processes mentioned herein may be embodied in computer-executable program code read from one or more of non-transitory computer-readable media, such as a hard disk drive, a nonvolatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, source database 310 begins execution of test workload 320. Test workload 320 may comprise a simulated workload intended to reflect the characteristics of an expected workload to be executed by target database 360. Monitoring of the workload begins at S410. At S420, workload monitor 330, which may comprise a component of source database 310 or any type of computing device that is or becomes known, may collect statistics from source database 310 reflecting the executing workload. Examples of such statistics will be described in detail below. The statistics may be stored in internal database 340. Then, after a predetermined time, event, or completion of the workload, monitoring of the workload and collection of the statistics stops at S430.

At S440, an IMRS cache size is determined by resource estimation component 350 based on the collected statistics. The determined IMRS cache size may be a cache size suitable for execution of a workload similar to workload 320 in a system providing IMRS MVCC or on-disk MVCC. Details of the determination according to some embodiments are provided below. If target system 360 is to provide on-disk MVCC, then the version database disk storage size is also determined by resource estimation component 350 based on the collected statistics at S450.

The determined resource sizes are output at S450. FIG. 5 shows user interface 500 operated by a database administrator according to some embodiments. User interface 500 shows an estimated IMRS cache size and version database size for each table in source database "tpcc", as well as a total estimated IMRS cache size and version database size for the source database. The administrator may proceed to configure and tune the allocation of resources within target database 350 based on the estimated values. According to some embodiments, source database 310 and target database 350 may comprise a same database.

Figure 6:
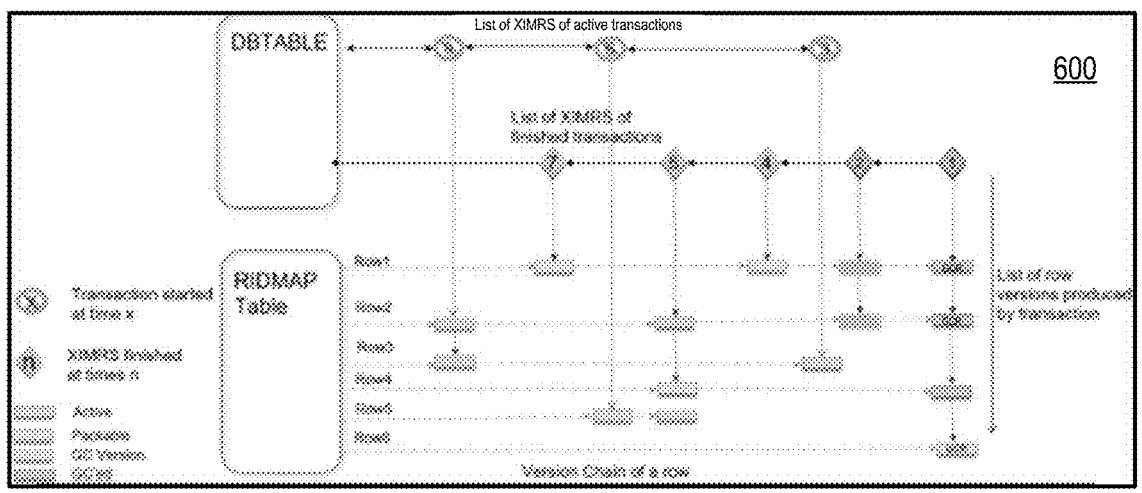
FIG. 6 is a mapping of table level components of an in-memory row store cache to row versions for an on-disk MVCC-enabled database according to some embodiments.

FIG. 6 illustrates a mapping of table level components of an IMRS cache to the row versions for an on-disk MVCC-enabled database. RIDMAP table 610 is an in-memory index to allow direct access to various row versions generated during operation. DBTable 620 contains a list of all active transactions and of all finished transactions. XIMRS denotes structures which support MVCC semantics by maintaining transaction-level information such as a time at which a transaction begins and ends, all row versions created by this transaction, etc. There is one XIMRS corresponding to each transaction.

As shown in the version chain of FIG. 6, there are no active scanners accessing any oldest versions of Row1. Accordingly, the versions of Row1 can be marked "GCR" (i.e., Ready for Garbage Collection) to indicate that a garbage collection background thread may remove these versions from the memory. A packable row version is a row version whose metadata may be removed from memory in the on-disk MVCC case.

Figure 7:
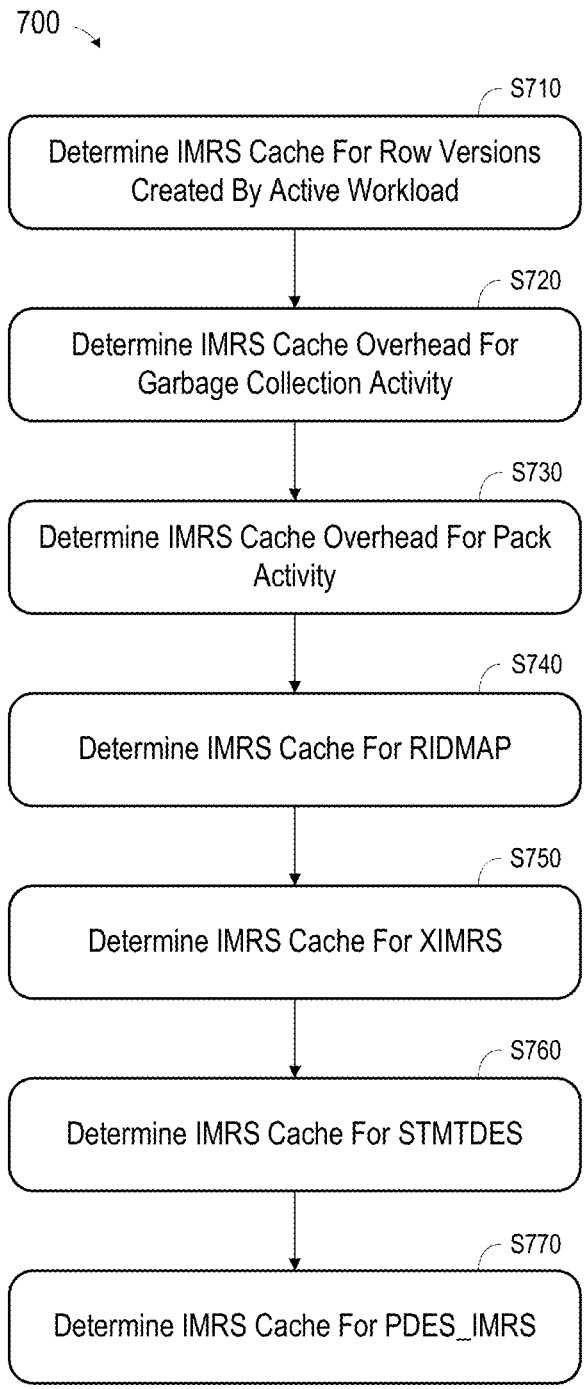
FIG. 7 is a flow diagram of a process to estimate an in-memory row store cache size according to some embodiments.

FIG. 7 is a flow diagram of a process to determine a total IMRS cache size according to some embodiments. Accordingly, process 700 may be used to implement S440 of process 400. The determinations of process 700 are based on statistics collected reflecting execution of a sample workload.

At S710, an IMRS cache size is determined for storing row versions created by an active workload. The active workload is a part of sample workload which may resemble an actual workload in a production system and may be executed in a separate system for a suitable amount of time (e.g., 5-10 minutes). The active workload consists of uncommitted transactions, and S710 determines resources required by transactions while they are active, irrespective of other garbage collection and packing overheads which come into play after a transaction is committed.

In order to determine an IMRS cache size for row versions created by an active workload, the number of latest active row versions and the number of older active row versions stored in the IMRS are estimated. For example, the active workload may insert a row, for which a version structure is stored in the IMRS representing an active version. If the row is updated, the updated version becomes the latest row version and the inserted row version becomes an older active row version.

The IMRS data structure stored in the IMRS cache for each row version includes data such as a timestamp, an identifier of the transaction that created the version, etc. The size of the version structure is fixed and known by virtue of database configuration. Accordingly, the IMRS cache size for row versions created by an active workload may be estimated at S710 by adding an estimated number of latest active row versions and an estimated number of older active row versions, and multiplying the sum by the known size of the IMRS version structure.

According to some embodiments, the number of latest active row versions and the number of older active row versions are estimated for each table in the database. All of the estimated table-level numbers of latest active row versions are summed to determine an overall estimated number of latest active row versions, and all of the estimated table-level numbers of older active row versions are summed to determine an overall estimated number of older active row versions. The overall estimated numbers are summed and multiplied by the known size of the IMRS version structure to determine the IMRS cache size for row versions created by the active workload.

The estimated number of latest active row versions for a given table may be determined by adding an estimated number of rows inserted in the table, an estimated number of rows updated in the table, and an estimated number of rows deleted from the table. The estimated number of older active row versions may be determined by adding an estimated number of rows updated in the table and an estimated number of rows deleted from the table.

The estimated number of rows inserted in a table may be determined based on a maximum number of rows inserted into the table in any given transaction of the workload. According to some embodiments, the estimated number of rows inserted in a table equals min (Conn_Factor*maximum_#_rows_inserted_in_xact, total number of rows inserted in table). "maximum_#_rows_inserted_in_xact" represents the maximum number of rows inserted into the table in any given transaction of the workload, while Conn_Factor is a measure of concurrency, or number of concurrent active transactions. Conn_Factor may equal a maximum number of parallel connections fired on the database at any point in time during the workload. Conn_Factor may be tuned by an administrator to represent a difference between the concurrency provided during workload execution on a test platform and concurrency expected during workload execution on a production database.

The estimated number of rows inserted in a table is bounded by the total number of rows actually inserted in the table during workload execution. Such a bounding addresses workloads in which, for example, one transaction inserts a great number of rows into the table but most other transactions insert a small number of rows. In such a case, the inserted number of rows may be vastly overestimated by multiplying the connection factor against the great number of rows inserted by the single transaction.

Similarly, in some embodiments, the estimated number of rows updated in a table equals min (Conn_Factor*maximum_#_rows_updated_in_xact, total number of rows in the table), and the estimated number of rows deleted in a table equals min (Conn_Factor*maximum_#_rows_deleted_in_xact, total number of rows deleted from the table).

Next, at S720, an IMRS cache overhead for garbage collection activity is determined. At some point during workload execution, some row versions will have no active scanners on them and can be freed via garbage collection. The cache overhead for garbage collection activity is the IMRS cache space occupied by such row versions until they are eventually freed by garbage collection threads.

The IMRS cache overhead for garbage collection activity may be determined by multiplying the IMRS cache size determined at S710 for each table by a garbage collection activity-related factor. The factor may be determined by heuristic.

In some embodiments, the IMRS cache overhead for garbage collection activity may be derived from the workload at S720. For example, a monotonically-increasing database-level counter may maintain the number of versions created in the database up to any given point in time. For every row insertion, this counter will be incremented by 1. Similarly, every update/delete will increment this counter by 2. For statement level isolation, every statement fired will record the number of versions already created before it begins execution. After finishing the execution, the statement will again record the number of versions created. The difference between the two values (i.e., the number of versions created before statement execution and the number of versions created after statement execution) is the number of versions that this statement blocked from garbage collection.

For transaction level isolation, the number of versions already created at the start of a transaction is recorded. The number of versions created after execution of the transaction is complete is also recorded. The difference between the two values (i.e., the number of versions created before transaction execution and the number of versions created after transaction execution) is the number of versions that this transaction blocked from garbage collection.

The IMRS cache overhead for garbage collection activity on a given table may then be determined by identifying the maximum number of versions blocked on that table at any given point at time and multiplying the number by the known size of the IMRS version structure.

An IMRS cache overhead for pack activity is determined at S730. Some row versions will be determined as packable during workload execution, and the cache overhead for pack activity determined at S730 is the IMRS cache space occupied by such row versions until they are eventually packed by packing threads. The IMRS cache overhead for pack activity may be determined by multiplying the IMRS cache size determined at S710 for each table by a pack activity-related factor. The pack activity-related factor may be determined by heuristic or may be derived from the workload.

An IMRS cache size for storing a RIDMAP structure is determined at S740. The RIDMAP structure enables quick and efficient access to specific row versions in the IMRS cache. The memory for the RIDMAP structure is allocated in the IMRS cache and its size is dependent on the size of the supported database.

The RIDMAP structure includes a RIDMAP table memory, a RIDMAP_AU memory, a RIDMAP_EXT memory, and a RIDMAP_PAGE memory. The RIDMAP table which points to some RIDMAP_AUs which point to RIDMAP_EXTs which point to RIDMAP pages which contain direct pointers to the row versions. The IMRS cache size for storing a RIDMAP structure may therefore be calculated by summing the IMRS cache size required for each of these memories.

The RIDMAP table memory may be of fixed size (e.g., 128 Mb). A size of the RIDMAP_AU memory may be calculated by determining a number of required RIDMAP_AU entries and multiplying this number by the size of the entries. For example, the number of entries may be determined by dividing the database size in bytes by 128*pagesize. A size of the RIDMAP_EXT memory may be calculated by determining a number of required RIDMAP_EXT entries and multiplying this number by the size of the entries. For example, the number of entries may be determined by dividing the database size in bytes by 8*pagesize.

The IMRS cache size required for the RIDMAP_PAGE memory is determined for each table by determining the number of RIDMAP pages needed to support the required row versions of each table. A particular RIDMAP page is not needed if there are no versions whose pointers will fall on this particular RIDMAP page. The number of RIDMAP pages needed depends on the distribution of latest row versions among the average rows which fall on one page of the persisted (i.e., on-disk) table. In some embodiments, the number of RIDMAP pages is determined by dividing the number of latest row versions by the average number of rows per page (i.e., number of rows/number of pages), and multiplying the result by a RIDMAP row distribution factor.

If a small percentage of a table is stored in the IMRS, there is a high chance that the accessed rows of that table will lie on different pages. The number of RIDMAP pages to be allocated will therefore be higher than in a case where the same number of rows are stored but the number of rows of the table are much smaller. In some embodiments, the RIDMAP row distribution factor is 30 if less than 0.05% of a table is stored in IMRS, 20 if less than 0.1% and more than 0.05% of a table is stored in IMRS, 12 if less than 0.5% and more than 0.1% of a table is stored in IMRS, 4 if less than 5% and more than 0.5% of a table is stored in IMRS, 2 if less than 50% and more than 5% of a table is stored in IMRS, and 1 otherwise.

The determined number of RIDMAP pages for a table is then multiplied by the known size of the RIDMAP pages to determine the memory required for the RIDMAP_PAGE memory associated with that table.

An IMRS cache size for storing XIMRS structures is determined at S740. The XIMRS structures provide transaction information for transactions running on the database, in order to support MVCC semantics. The maximum concurrency at any given time is equal to the maximum number of XIMRS structures present in the IMRS at any given time. Accordingly, the estimated IMRS cache size for storing XIMRS structures may be determined at S750 as the maximum concurrency (e.g., Conn_Factor) multiplied by the known size of an XIMRS structure.

Similarly, the maximum concurrency at any given time is equal to the maximum number of statement descriptors present in the IMRS at any given time. The IMRS cache size for storing statement descriptors may be determined at S760 as the maximum concurrency (e.g., Conn_Factor) multiplied by the known size of a STMTDES structure.

As is known, the PDES_IMRS structures are also used to support MVCC semantics. PDES_IMRS structures are used for storing information relating to partitions. Moreover, a PDES_IMRS counter is associated with each database processing engine for each of the structures. An IMRS cache size for storing PDES_IMRS structures is determined at S770 by multiplying the number of partitions in the database by the known size of a PDES_IMRS structure, and adding the product of the size of the PDES_IMRS counter and the number of processing engines. The number of processing engines may be capped, for example at 64.

The total IMRS cache size for the sample workload may be determined as the sum of the sizes determined at S710 through S770.

Figure 8:
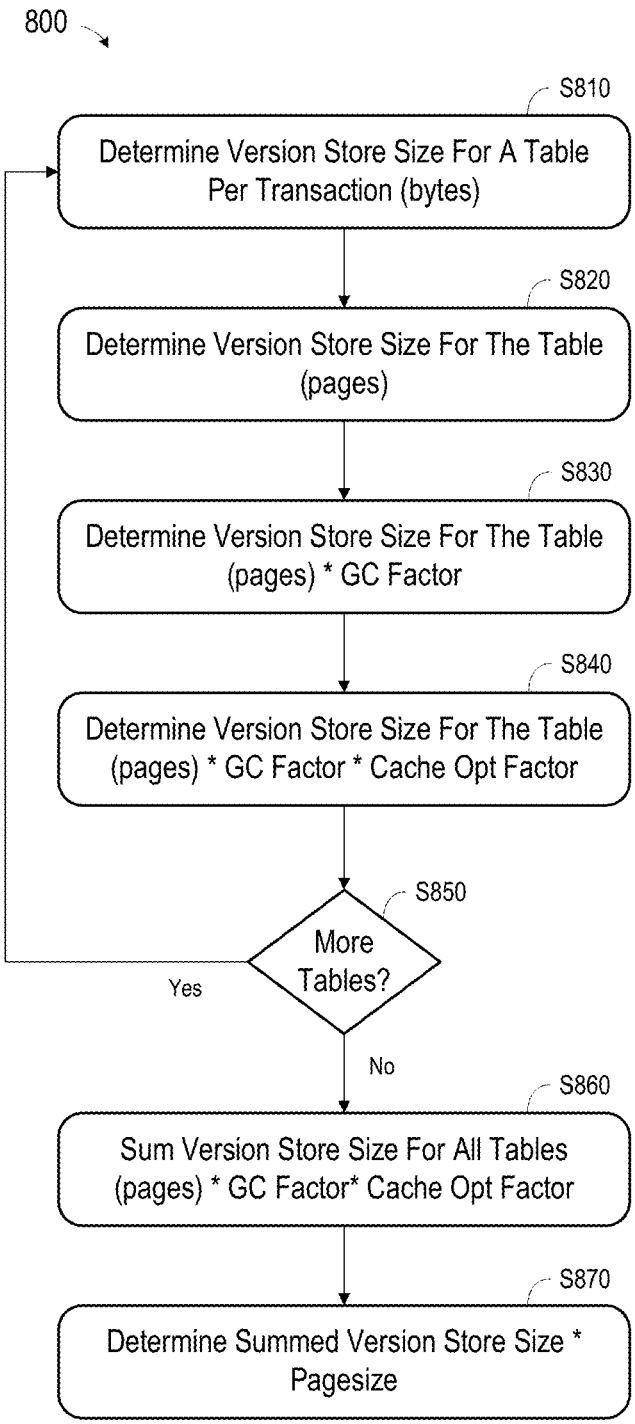
FIG. 8 is a flow diagram of a process to estimate an on-disk version store size according to some embodiments.

FIG. 8 is a flow diagram of a process to estimate an on-disk version store size for systems using on-disk MVCC according to some embodiments. Initially, at S810, the version store size needed per transaction for a particular table is determined in bytes. This may be determined by summing the number of updates and the number of deletes of a transaction and multiplying the sum by the maximum row length of the table. The maximum row length may be determined from the definition of the table columns. The number of inserts are not considered because inserts do not create older versions which reside on disk.

The value determined at S810 is divided by the page size at page S820 to determine the version store size for the table in pages. According to some embodiments, a separate on-disk page is allocated for each transaction, and therefore the value may be further multiplied by the above-described Conn_Factor at S820.

The value determined at S820 may be multiplied by a garbage collection factor at S830. The garbage collection factor accounts for additional memory consumption while garbage collection frees memory from disk storage.

Next, at S840, the value determined at S830 is multiplied by a cache optimization factor. According to some embodiments, a disk cache is used on top of the disk storage of row versions for faster access to frequently or recently-used versions. The disk cache for a table in some embodiments may consume 20% of the disk storage allocated for the table. In order to ensure that all the required disk storage can be held in the cache, the cache optimization factor is 5 in some embodiments.

If more tables exist, flow returns from S850 to S810 to execute S810 through S840 for a next table. Flow proceeds from S850 to S860 once a value is determined for each table at S840. The determined values are summed at S860 to determine an overall disk version store size in pages. Accordingly, this value may be multiplied at S870 by the page size in bytes to determine the overall disk version store size in bytes.

Some embodiments may determine whether MVCC should be enabled for a table based on whether MVCC would provide an acceptable level of benefit to operations performed on the table. A score may be calculated for each table to determine a suitability of MVCC for each table.

In some embodiments, since MVCC assists in resolving the blocking of select queries, the score is based on the number of times a select query fired on the table is blocked. The greater the number of blocked select queries, the higher the score. More specifically, determination of the score for a table may be based on a number of reader waits (e.g., SH_WAITS) on the table during execution of the test workload, and/or on whether the table is part of a join with tables having a high score.

Figure 9:
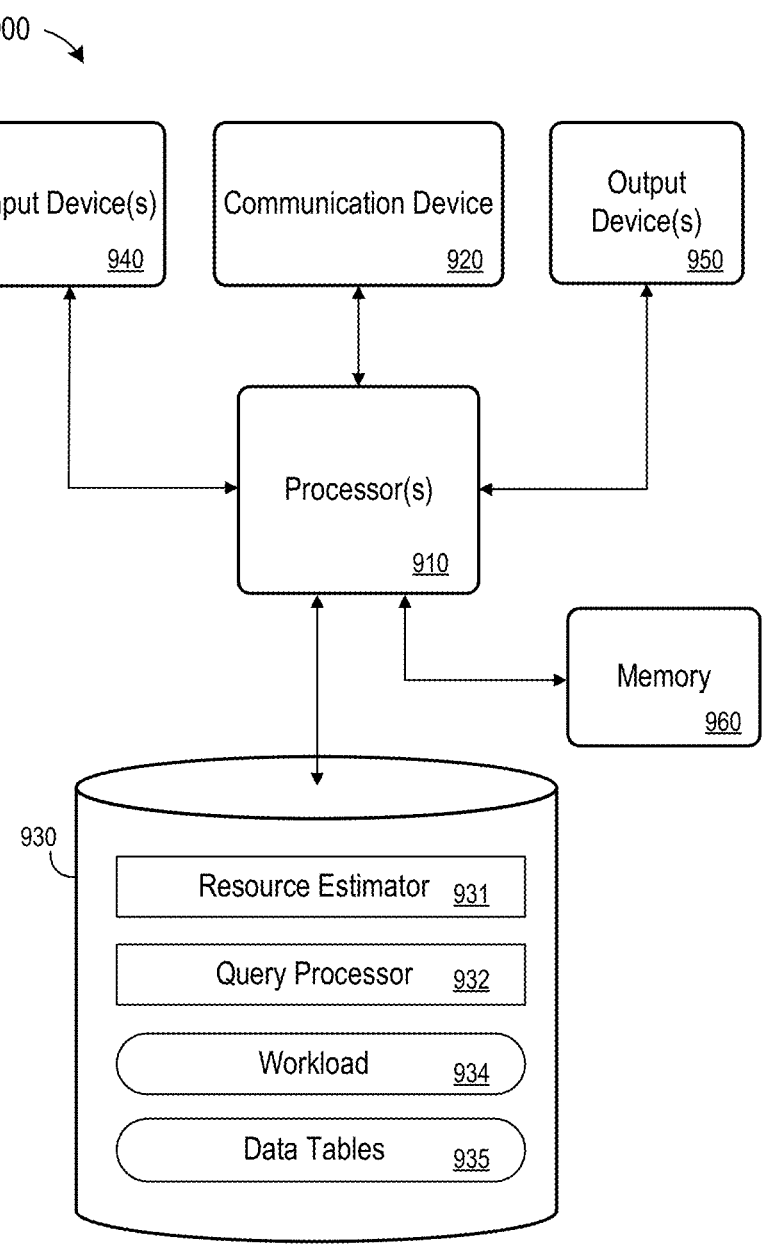
FIG. 9 is a block diagram of a database system according to some embodiments.

FIG. 9 is a block diagram of database system 900 according to some embodiments. Database system 900 may comprise a general-purpose computing apparatus and may execute program code to perform any of the functions described herein. Database system 900 may comprise an implementation of database system 100 or 200 in some embodiments. Database system 900 may include other unshown elements according to some embodiments.

Database system 900 includes processor(s) 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM). Memory 960 may store an IMRS cache, row storage cache and/or buffer cache as described herein.

Resource estimator 931 and query processor 932 each comprise program code executed by processor(s) 910 to cause server 900 to perform any one or more of the processes described herein. Embodiments are not limited to execution of these processes by a single computing device.

Workload 934 may comprise a test workload for generating statistics as described herein. Data tables 935 may include database tables, including temporary tables used to support on-disk MVCC. Data tables 935 may also comprise system tables specifying a configuration of system 900. Such a configuration may specify a memory size to allocate within memory 960 for an IMRS cache and/or a storage size to allocate on storage device 930 to store MVCC row versions. Data storage device 930 may also store data and other program code for providing additional functionality and/or which are necessary for operation of system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
    a memory storing processor-executable process steps; and
    a processor to execute the processor-executable process steps to:
        execute a database workload on a plurality of database tables;
        collect execution statistics associated with execution of the database workload;
        determine an in-memory row storage cache size for multi-version concurrency control based on the collected execution statistics; and
        configure a database system to allocate the in-memory row storage cache size for multi-version concurrency control.

2. A system according to claim 1, the processor to execute the processor-executable process steps to:
    determine a version database disk storage size for on-disk multi-version concurrency control based on the collected execution statistics,
    wherein configuration of the database system comprises configuration of the database system to allocate the version database disk storage size for on-disk multi-version concurrency control.

3. A system according to claim 2, wherein determination of the in-memory row storage cache size comprises:
    determination of a first cache size for latest active row versions and older active row versions created for each database table during execution of the database workload;
    determination of a second cache size associated with garbage collection during execution of the database workload; and
    determination of a third cache size associated with pack activity during execution of the database workload, and
    wherein determination of the version database disk storage size comprises:
    determination of a disk size for each database table based on a number of updates and deletes on each database table and the maximum row length of each database table.

4. A system according to claim 3, wherein determination of the second cache size associated with garbage collection during execution of the database workload comprises:
    determination of a number of row versions which were blocked from garbage collection during execution of the database workload.

5. A system according to claim 1, wherein determination of the in-memory row storage cache size comprises:
    determination of a first cache size for latest active row versions and older active row versions created for each database table during execution of the database workload;
    determination of a second cache size associated with garbage collection during execution of the database workload; and
    determination of a third cache size associated with pack activity during execution of the database workload.

6. A system according to claim 5, wherein determination of the in-memory row storage cache size further comprises:
    determination of a fourth cache size associated with storage of RIDMAP structures during execution of the database workload;
    determination of a fifth cache size associated with storage of XIMRS structures during execution of the database workload
    determination of a sixth cache size associated with storage of statement descriptors during execution of the database workload; and
    determination of a seventh cache size associated with storage of in-memory row storage page descriptors during execution of the database workload.

7. A system according to claim 6, wherein determination of the second cache size associated with garbage collection during execution of the database workload comprises:
    determination of a number of row versions which were blocked from garbage collection during execution of the database workload.

8. A computer-implemented method comprising:
    executing a database workload on a plurality of database tables;
    collecting execution statistics associated with execution of the database workload;
    determining an in-memory row storage cache size for multi-version concurrency control based on the collected execution statistics; and
    outputting the determined in-memory row storage cache size to a database administration system.

9. A method according to claim 8, further comprising:
    determining a version database disk storage size for on-disk multi-version concurrency control based on the collected execution statistics,
    wherein outputting the determined in-memory row storage cache size comprises outputting the determined version database disk storage size for on-disk multi-version concurrency control.

10. A method according to claim 9, wherein determining of the in-memory row storage cache size comprises:
    determining a first cache size for latest active row versions and older active row versions created for each database table during execution of the database workload;
    determining a second cache size associated with garbage collection during execution of the database workload; and
    determining a third cache size associated with pack activity during execution of the database workload, and wherein determining the version database disk storage size comprises:
determining a disk size for each database table based on a number of updates and deletes on each database table and the maximum row length of each database table.

11. A method according to claim 10, wherein determining the second cache size associated with garbage collection during execution of the database workload comprises:
determining a number of row versions which were blocked from garbage collection during execution of the database workload.

12. A method according to claim 8, wherein determining the in-memory row storage cache size comprises:
determining a first cache size for latest active row versions and older active row versions created for each database table during execution of the database workload;
determining a second cache size associated with garbage collection during execution of the database workload; and
determining a third cache size associated with pack activity during execution of the database workload.

13. A method according to claim 12, wherein determining the in-memory row storage cache size further comprises:
determining a fourth cache size associated with storage of RIDMAP structures during execution of the database workload;
determining a fifth cache size associated with storage of XIMRS structures during execution of the database workload
determining a sixth cache size associated with storage of statement descriptors during execution of the database workload; and
determining a seventh cache size associated with storage of in-memory row storage page descriptors during execution of the database workload.

14. A method according to claim 13, wherein determining the second cache size associated with garbage collection during execution of the database workload comprises:
determining a number of row versions which were blocked from garbage collection during execution of the database workload.

15. A system comprising:
a source database to execute a database workload on a plurality of database tables;
a processor, and
a memory storing processor-executable instructions that when executed by the processor enable the system to:
determine an in-memory row storage cache size for multi-version concurrency control based on execution statistics associated with execution of the database the collected execution statistics; and
output the in-memory row storage cache size for multi-version concurrency control; and
a target database configured to allocate the determined in-memory row storage cache size for multi-version concurrency control.

16. A system according to claim 15, the resource estimator to:
determine a version database disk storage size for on-disk multi-version concurrency control based on the collected execution statistics,
wherein the target database is configured to allocate the version database disk storage size for on-disk multi-version concurrency control.

17. A system according to claim 16, wherein determination of the in-memory row storage cache size comprises:
determination of a first cache size for latest active row versions and older active row versions created for each database table during execution of the database workload;
determination of a second cache size associated with garbage collection during execution of the database workload; and
determination of a third cache size associated with pack activity during execution of the database workload, and
wherein determination of the version database disk storage size comprises:
determination of a disk size for each database table based on a number of updates and deletes on each database table and the maximum row length of each database table.

18. A system according to claim 17, wherein determination of the second cache size associated with garbage collection during execution of the database workload comprises:
determination of a number of row versions which were blocked from garbage collection during execution of the database workload.

19. A system according to claim 15, wherein determination of the in-memory row storage cache size comprises:
determination of a first cache size for latest active row versions and older active row versions created for each database table during execution of the database workload;
determination of a second cache size associated with garbage collection during execution of the database workload; and
determination of a third cache size associated with pack activity during execution of the database workload.

20. A system according to claim 19, wherein determination of the second cache size associated with garbage collection during execution of the database workload comprises:
determination of a number of row versions which were blocked from garbage collection during execution of the database workload.

* * * * *